D. McCOMB, dec'd.

MARY ANN McCOMB, Adm'x.

Bale-Ties.

No. 5,616. Reissued Oct. 21, 1873.

WITNESSES:

Jas. E. Hutchinson

John R. Young

ADMINISTRATRIX.

Mary A. McComb, by Prindle and Co., her

ATTORNEY'S.

AM. PHOTO-LITHOGRAPHIC Co. N.Y. (OSBORNE'S PROCESS)

UNITED STATES PATENT OFFICE.

MARY ANN McCOMB, OF MEMPHIS, TENNESSEE, ADMINISTRATRIX OF DAVID McCOMB, DECEASED.

IMPROVEMENT IN BALE-TIES.

Specification forming part of Letters Patent No. 15,142, dated June 17, 1856; extended seven years; reissue No. 4,993, dated July 16, 1872; reissue No. 5,616, dated October 21, 1873; application filed April 28, 1873.

*To all whom it may concern:*

Be it known that DAVID McCOMB, deceased, late of Memphis, in the county of Shelby and State of Tennessee, did invent certain new and useful Improvements in Methods of Securing Metallic Ties around Cotton-Bales, for which Letters Patent No. 15,142 were issued to him upon the 17th day of June, 1856, which said Letters Patent, being extended for a period of seven years, were surrendered, thereafter duly reissued, as provided by law, bearing date of the 16th day of July, 1872, and numbered 4,993; which reissued Letters Patent have been found defective, in that the specification and claims do not cover and embrace all of the original invention and improvements as contained in the model and drawings filed in the United States Patent Office on the 4th day of April, 1856. Now, therefore, being desirous to reissue the said Letters Patent in the manner and form prescribed by law, I have prepared and do hereby declare that the following is a full, clear, and exact description of the said improvements, reference being had to the accompanying drawing, making a part of this specification, in which—

Figure 1:
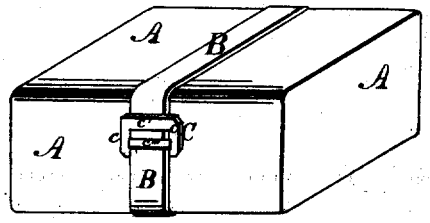
Figure 2:
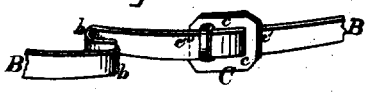
Figure 3:
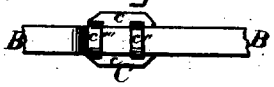

Figure 1 is a perspective view of a cotton-bale bound with a metallic hoop having its ends united and secured by a slotted link. Fig. 2 is a like view of the inner side of said hoop with the sliding link withdrawn from engagement with its hooked ends. Fig. 3 is a plan view of said parts when in position, and Fig. 4 is a longitudinal section upon line *x x* of Fig. 3.

Letters of like name and kind refer to like parts in each of the figures.

The object of this invention is to render practicable the employment of metallic ties upon and around cotton-bales; and it consists, principally, in combining with the hooked ends of metallic ties a slotted link for the purpose of keeping said ends in position, and assisting to prevent the opening of the hooks by the expansive force of the bale, substantially as is hereinafter specified. It consists, further, in the method of baling cotton or other like material by means of a slotted link or tie-plate and metallic ties having their ends bent into hooked form, and held in position by said link and the expansive force of the bale, substantially as is hereinafter shown. It consists, finally, in the method of uniting the ends of the hoop or tie by means of a sidewise motion, substantially as described, so as to be confined and held by the slotted link, whereby less metal is required for said hoop, and less space for the bale, than would be necessary if said hooked ends were engaged with each other or to said link by a movement in the direction of the length of said hoop, substantially as is hereinafter set forth.

Figure 4:
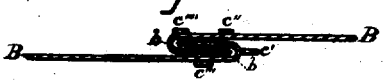

In the annexed drawing, A represents a cotton-bale bound with a metallic hoop or tie, B, the ends of which are bent backward in opposite directions, so as to form hooks *b*, that, when placed in engagement, as shown in Fig. 4, confine said hoop closely in place upon and around said bale.

The hoop or band being placed in position around the bale, its ends are engaged by a sidewise motion, which causes the hooks to slide edgewise within each other, by which means no more metal is required than the exact amount necessary to encircle said bale while under pressure; but slight expansion of said bale is possible when said pressure is removed, while the operation of tying the same is rendered much more easy than would be possible were said hooked ends engaged by a longitudinal motion.

It will be seen that, before pressure is removed from the bale, the hooked ends of the hoop are liable to become disengaged, and that when such pressure is removed the expansive force of said bale will open the hooks and thus destroy the fastening.

To prevent these difficulties a slotted link, C, consisting of two side bars, *c*, arranged in parallel lines, and united by means of four cross-bars, $c'$, $c''$, $c'''$, and $c''''$, is, by the method preferred and particularly described, slipped over the combined hooks, as shown in Fig. 4, two of said cross-bars, $c'$ and $c'''$, being upon the outer side of the outer hook, a third bar, $c''$, upon the inner side of the inner hook, while the fourth bar $c''''$ bears against the doubled end of the inner hook, and prevents said link from passing too far forward or downward.

When the pressure upon the bale is now removed said bale expands against the hoop, and so far opens the hooks upon the ends of the same as to force them against the bars of the link, and thus bind said hooks and link securely together.

It is evident from the mode in which the slotted link is constructed that the hooked ends of the hoop may, if desired, be attached directly thereto, in which case such ends would be confined by the expansion of the bale, as before stated; but it is preferred to attain the said advantages of uniting the ends of the hoop by the sidewise motion described, or by such other method as will secure such advantages, and at the same time hold said hoop ends by the friction between the same and said slotted link, as set forth.

By means of this improved tie bales are made with greater ease and rapidity, the full strength of the metal is utilized in consequence of its not being weakened by rivet-holes, notches, &c., while said bales are kept in better condition, and are rendered more secure from the danger of destruction by fire, or of damage by water, than when bound by rope.

Having thus fully set forth the nature and merits of these improvements, what is claimed as new, and the invention of the said DAVID McCOMB, is—

1. In combination with the hooked ends of metallic ties, a slotted link for the purpose of keeping said ends in position, and assisting to prevent the opening of the hooks by the expansive force of the bale, substantially as specified.

2. The method of baling cotton or other like material by means of a slotted link or tie-plate and metallic ties having their ends bent into hooked form, and held in position by said link and the expansive force of the bale, substantially as is shown.

3. The method of baling cotton or other like material by means of metallic ties having their ends of hooked form, substantially as described, so as to permit of their being united by a sidewise motion, as set forth.

In testimony whereof I have hereunto set my hand this 3d day of April, 1873.

MARY A. McCOMB,
*Administratrix.*

Witnesses:
GEO. S. PRINDLE,
JOHN R. YOUNG.